United States Patent [19]

Yukino

[11] Patent Number: 4,904,851
[45] Date of Patent: Feb. 27, 1990

[54] IDENTIFICATION AUTHENTICATING SYSTEM

[75] Inventor: Eiichi Yukino, Kanagawa, Japan

[73] Assignee: Hitachi Ltd., Tokyo, Japan

[21] Appl. No.: 121,239

[22] Filed: Nov. 16, 1987

[30] Foreign Application Priority Data

Nov. 17, 1986 [JP] Japan .............................. 61-271886

[51] Int. Cl.4 ............................................ G06F 15/30
[52] U.S. Cl. .................................... 235/379; 235/492; 902/5; 902/26; 340/825.34; 380/24
[58] Field of Search ..................... 235/379, 492; 902/5, 902/25, 26; 380/23, 24; 340/825.34

[56] References Cited

U.S. PATENT DOCUMENTS 4,709,137 11/1987 Yoshida .......................... 235/492 X Primary Examiner—David L. Trafton
Attorney, Agent, or Firm—Fay, Sharpe, Beall, Fagan, Minnich & McKee

[57] ABSTRACT

An identification authenticating system includes a first memory for storing a program to perform a preselected calculation on an input value to obtain an expected result. An input value is supplied to the program wherein calculation is performed thereon. An external signal is supplied, and that signal is compared the expected result. A comparison determines whether the expected result and input value correspond to one another, thereby authenticating an identification.

12 Claims, 3 Drawing Sheets

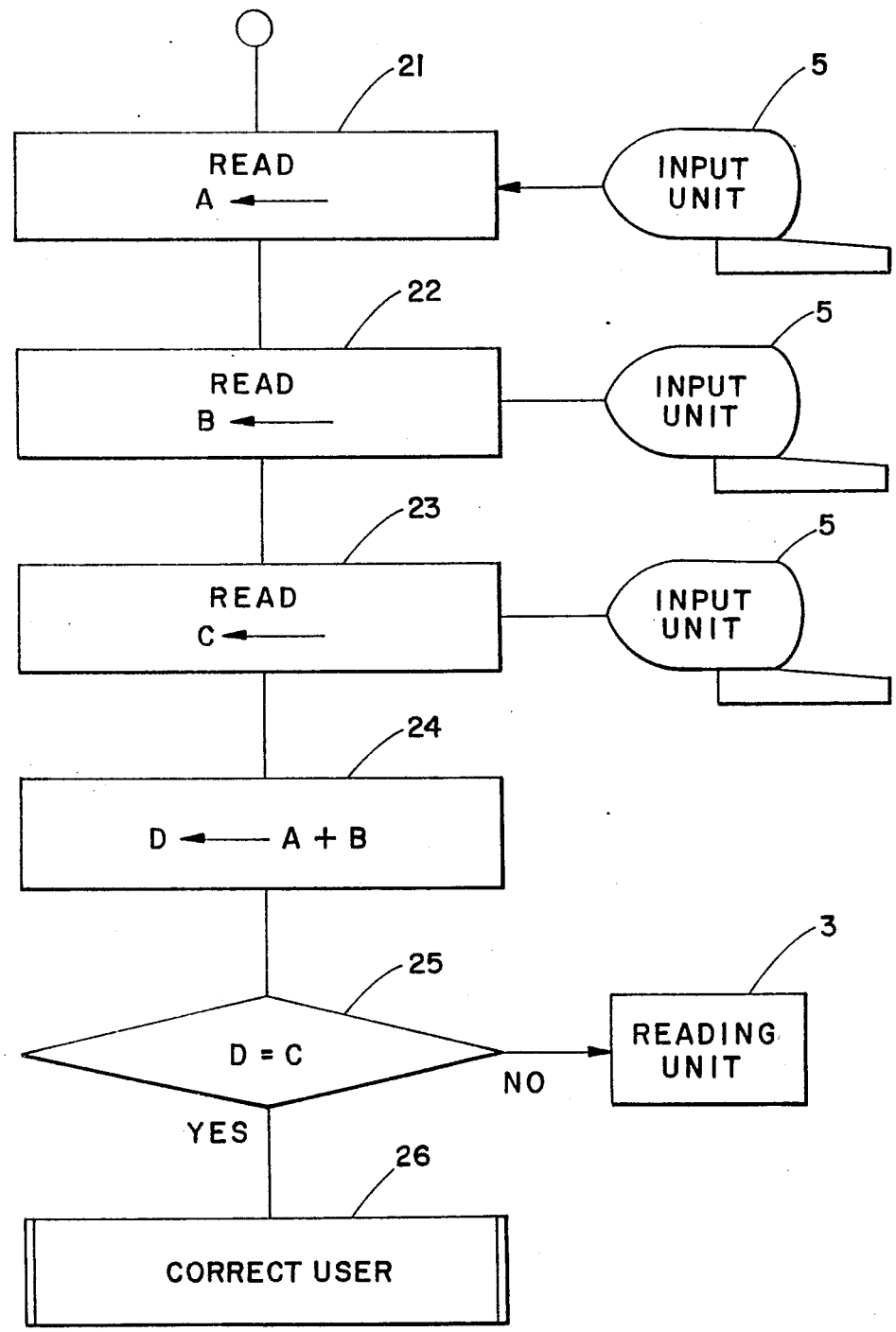
F I G. 3

IDENTIFICATION AUTHENTICATING SYSTEM

BACKGROUND OF THE INVENTION

This invention relates to an authentication system and more particularly to an authentication system which will be suitable for preventing the abuse of a personal identification unit, such as a magnetic card, an IC card, an optical card and the like prepared for permitting information reference and handling.

An automatic cash dispenser is a typical example of an authentication system which requires a protection scheme to provide security to users. Verification of the bearer of a magnetic card which facilitates access to the cash dispenser is made by checking whether or not a secret number registered to the magnetic card coincides with an input number which is generally manually inputted to the cash dispenser each time a transaction is made. In such a security system, a typical technique for preventing the illegal use of the magnetic card is disclosed, for example, in Japanese Patent Publication No. 29083/1974.

In accordance with the earlier technique, a frequency of errors of coincidence between the secret number recorded on the magnetic card and the manually inputted secret number is recorded, and when the number of times exceeds a predetermined value, that magnetic card is invalidated.

The possibility of illegal use in the prior art technique described above can be reduced by a method such as increasing the number of digits of the secret number, but to do so renders it more difficult for a legal user to remember the number. Therefore, this method has low practical utility. Numbers of four figures are generally employed as the secret numbers of the automatic cash dispensers.

Often times, the secret number may be selectable by a user. It is said that most of the users of the card use the date of their birth or telephone number as the secret number. The magnetic card is subject to illegal use when the card falls into the hands of an illegal user as a result of loss or theft. In such a case, not only the magnetic card, but also the license and name card might fall into the hands of the illegal user. Therefore, he can guess at the prime candidate numbers for the secret number. Since the erroneous input of the secret number is permitted to a predetermined value as described above, the illegal user can make several attempts at the secret number within the range of the predetermined number. In the case such as described above, the illegal user can often be found.

SUMMARY OF THE INVENTION

An object of the invention is to obviate such a disadvantage. Another object of the invention is to provide an authentication system which is used easily for legal users without any trouble. Another object of the invention is to provide an authentication system which cannot be deciphered easily by the illegal user.

In accordance with the present invention, the personal identification unit has a first memory adapted for storing a program to perform a uniquely assigned calculation on an input value to obtain an expected result. An apparatus, such as an automatic check dispenser includes means for generating the expected result in accordance with the calculation, means for placing the first memory means in data communication with the generating means and means for supplying the input value to the program whereby the calculation is performed. The apparatus also includes means for receiving an external signal and means for comparing the expected result and the external signal to authenticate the identification.

The data which the program stored in the personal identification unit is the data based on the algorithm incorporated in the program. Therefore, those users who do not know the algorithm cannot input the expected data into the apparatus. Hence, the illegal use of the card can be prevented.

BRIEF DESCRIPTION OF THE DRAWINGS

The invention may take physical form in certain parts and arrangements of parts which will be described in detail in this specification and illustrated in the accompanying drawings which form a part hereof and wherein:

FIG. 3 is a flow chart of another example of a program stored in the memory of FIG. 1.

DESCRIPTION OF THE PREFERRED EMBODIMENTS

Figure 1:
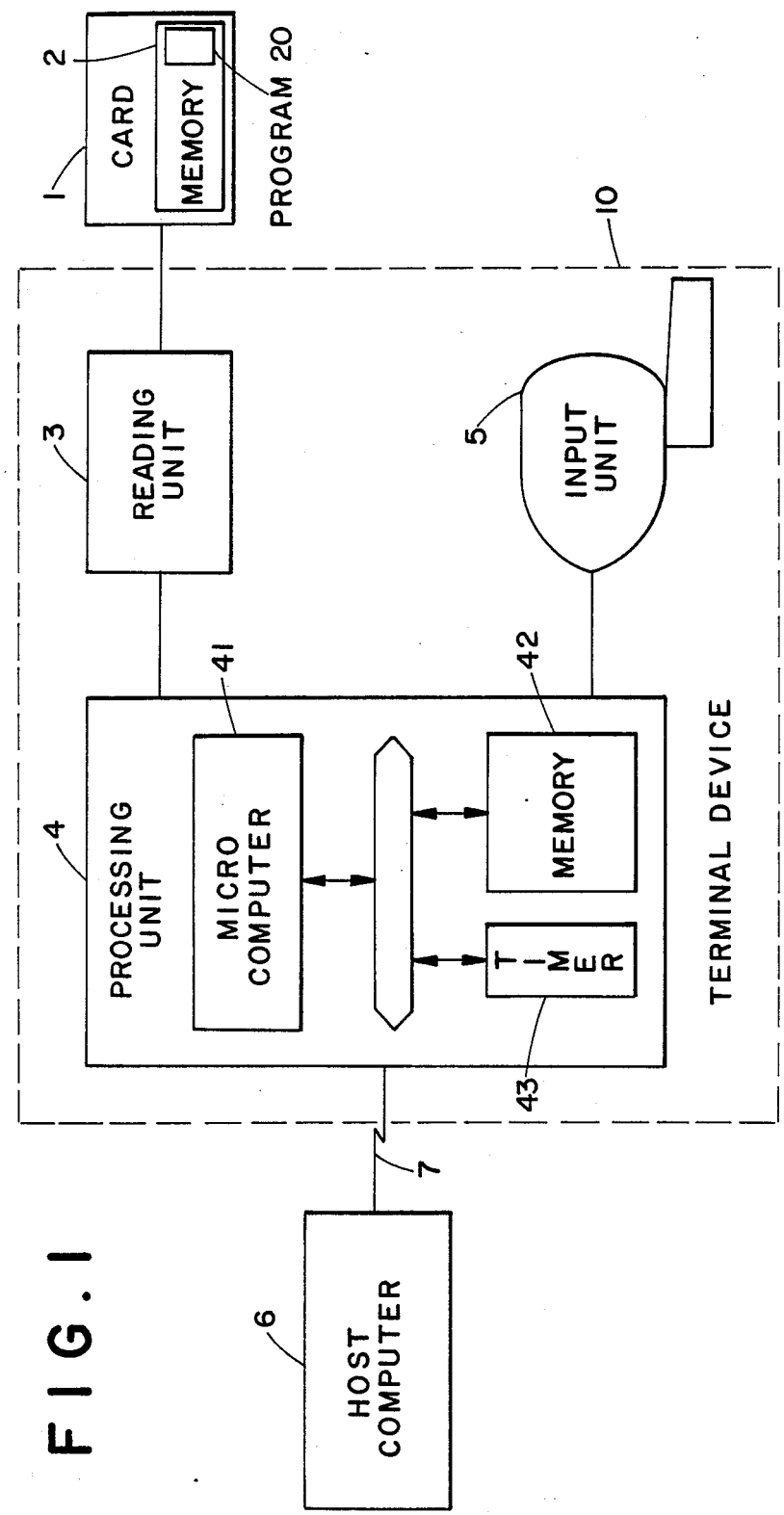
FIG. 1 is a block diagram of the authentication system in accordance with the present invention.

The authentication system illustrated in FIG. 1 comprises a personal identification unit (hereinafter "card") 1 and a terminal device 10 such as automatic cash dispenser terminal. The card 1, in this embodiment, is an IC card which includes a memory 2, although it will be appreciated that other suitable objects such as a conventional magnetic strip may be used. The memory has a predetermined memory capacity and is adapted for storage therein of a program 20. The program 20 performs a preselected calculation to obtain an expected result dedicated to the legal bearer of the card. This program may be written in a general-purpose language such as Basic, in a specific language not known to the public, or encoded by using security number.

The terminal device 10 includes a reading unit 3 which receives the card 1 and places the card in data communication with the terminal device 10. The terminal device also includes a processing unit 4 which is electrically interfaced with the reading unit 3. The processing unit 4 incorporates therein a microcomputer 41, a memory 42, and a timer 43. The micorcomputer 41, the memory 42, and the timer 43 are connected to each other via data lines. The memory 42 is placed in data communication with the card 201 through the reading unit 3, and includes a memory area into which, may be stored a copy of the program 20, stored in the memory 2.

The memory 42 includes another memory area, not shown, for storing a compiler program which translates the program language and the security number. If the program 20 is described in a higher level source code such as Basic or the specific language, the microcomputer executes the compiler program so that the copy of the program 20 is compiled into an executable machine language program. The machine language program is then stored in another memory area of the memory 42. If the program 20 is encoded by using the security number to obtain machine language program, the microcomputer decodes the program 20 by using the number which is stored in the memory 42. Hereinafter the machine language program is called a copy program.

The terminal device 10 also includes an input unit 5 which has a keyboard and receives an external signal such as a key-in signal. The microcomputer is placed in data communication with the input unit 5 and receives an external signal which is necessary for a calculation and, if necessary, receives data from the timer 43 and/or the input unit 5 during the execution of the copy program. The processing unit 4 is placed in data communication with a host computer 6 via line 7.

When the owner of the card 1 interfaces it to the reading unit 3, the reading unit 3 reads the program of the card 1 and transfers it to the processing unit 4. The processing unit 4 stores this program in its memory. After setting the card 1 to the reading unit 3, the owner of the card 1 inputs the data from the input unit 5 on the basis of the algorithm that is incorporated in the program 20. The processing unit 4 executes the program copy into which the program 20 is translated by using the compiler program or the security number or both. The microcomputer generates the expected result in accordance with the calculation defined by the program 20. The microcomputer also compares the expected result and the external signal from the input unit and judges whether or not the card 1 is used by legal user.

In accordance with the present invention as described above, one cannot input the correct data expected by the program 20 unless he knows the content of the program 20 in the card 1, and the illegal user cannot guess the data from the date of birth, telephone number, and the like, of the legal user. Accordingly, a highly reliable security system can be obtained. If the program 20 in the card 1 is written in a specific language not known generally, it becomes possible to prevent the program 20 in the card 1 from being read out independently and hence, improving further the security.

Figure 2:
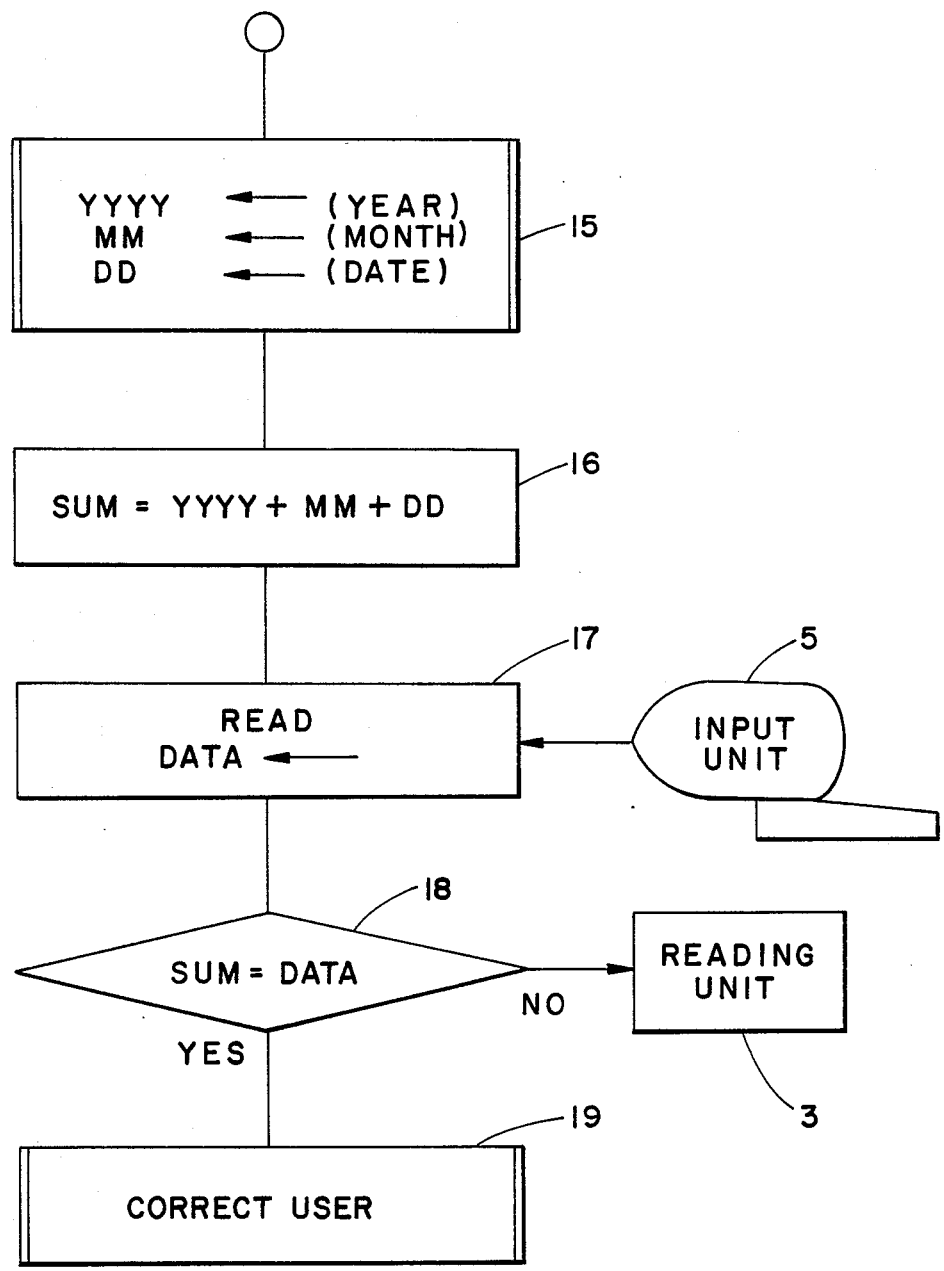
FIG. 2 is a flow chart of one example of a program stored in the memory of FIG. 1.

FIGS. 2 and 3 show flow charts of typical examples of the program 20. The operation of the present invention will be described in further detail with reference to these flow charts.

The flow chart shown in FIG. 2 represents a program which expects the input of the numeric value as the sum of the date of use, that is, the year, month, and day, from the input unit. In this case, processing in the processing unit 4 is carried out in the following way.

In step 15, the microcomputer 41 reads the current date, such as the year YYYY, the month MM and the day DD, from the timer 43 and this value is set to a register (not shown) or the like in accordance with the copy program. The variables YYYY, MM, and DD are added in step 16 to generate the expected result SUM. In step 17, the external data inputted by the user of the card 1 is set from the input unit 5 as a variable DATA to a register of the like.

In step 18, the microcomputer 4 compares the expected result SUM thus obtained with the external DATA, judges that the user of the card 1 is the correct user if they are in agreement, and that the card 1 is used unfairly if they do not coincide with each other. In accordance with this judging the reading unit 3 is selectively directed to disenable the card 1.

In this embodiment, the owner of the card 1 sets the card 1 to the reading unit 3 and inputs the sum of the date, i.e. the year, the month and the day, from the input unit 5. As, this data changes every day and it is extremely difficult for the third party who does not know the generation algorithm of that data to use the card 1 illegally.

The flow chart shown in FIG. 3 represents the program which requires data input from the input unit 5 three times, and expects the input of the value which contains the sum of the first and second arbitrary input data as the third input data. In this case, processing by the processing unit 4 is carried out in the following way.

The microcomputer 4 receives and sets the first, second, and third data inputted from the input unit 5 as the input value A and B and the external signal C (steps 21-23). In step 24, the expected result is calculated by adding the variables A and B (steps 21 to 24). In step 25, the microcomputer 4 compares the expected result D with the external signal C and judges that the user of the card 1 is the correct user, if they are in agreement, and that the user is an illegal user if they are not, in the same way as in FIG. 2, and instructs the reading unit 3 to terminate the card 1 (steps 25 and 26).

In this embodiment, too, it is extremely difficult for the third party who does not know the algorithm of inputting which data in response to three times of data input requests to illegally use the card 1.

Since the programs shown in FIGS. 2 and 3 are merely illustrative, any program can be used so long as the correct user can easily remember it. The system of the invention can also be used in combination with the conventional secret number, or the like. As noted above, the program may also be written not only in a general-purpose language, but also in a specific language not known generally which is stored in the card 1.

In this embodiment, an automatic cash dispenser invention is described. The invention is capable for applications not only to the banking business, but also such applications as entrance management and the like.

In accordance with the present invention as described above, the program in the card can be preselected and inherent to the legal user of the card, so that the illegal use by the third poarty who does not know this program becomes extremely difficult.

The invention has been described with reference to the preferred embodiments. Obviously, modifications and alternations will occur to others upon the reading and understanding of this specification. It is intended that all such modifications and alterations be included insofar as they come within the scope of the appended claims or the equivalents thereof.

What is claimed is:

1. A system for authenticating identification comprising:
   first memory means adapted for storing a program to perform a preselected calculation on an input value to obtain an expected result;
   means for generating the expected result in accordance with the calculation;
   means for placing the first memory means in data communication with the generating means;
   a second memory means, placed in data communication with the first memory means and the generating means, the second memory means being adapted for storage of a copy of the program of the first memory means;
   a means for reading out the program from the second memory means in accordance with the execution of the generating means;
   means for supplying the input value to the program whereby the calculation is performed thereon;

means for receiving an external signal; and means for comparing the expected result and the external signal to authenticate the identification.

2. A system for authenticating identification comprising:

first memory means adapted for storing a program to perform a preselected calculation on an input value to obtain an expected result;

means for generating the expected result in accordance with the calculation;

means for placing the first memory means in data communication with the generating means;

means for suppling the input value to the program whereby the calculation is performed thereon;

means for receiving an external signal;

means for comparing the expected result and the external signal to authenticate the identification;

a host computer;

means for placing the host computer in data communication with the comparing means; and means for transmitting data between the comparing means for the host computer.

3. A system for authenticating identification comprising:

first memory means adapted for storing a program to perform a preselected calculation on an input value to obtain an expected result;

means for generating the expected result in accordance with the calculation;

means for placing the first memory means in data communication with the generating means;

means for supplying the input value to the program whereby the calculation is performed thereon;

means for receiving an external signal;

means for comparing the expected result and the external signal to authenticate the identification; and means for selectively terminating data communication between the first memory and the generating means as the result of the comparison.

4. A system for authenticating identification comprising:

first memory means adapted for storing a program to perform a preselected calculation on an input value to obtain an expected result;

means for generating the expected result in accordance with the calculation;

means for placing the first memory means in data communication with the generating means;

a second means, placed in data communication with the first memory means and the generating means, the second memory means being adapted for storage of a copy of the program of the first memory means;

encoding means for encoding the program in a preselected language and to be prestored in the first memory;

compiler program means for compiling the preselected language of the program into an executable machine language program, the compiler program means being stored in the second memory;

means for supplying the input value to the program whereby the calculation is performed thereon;

means for receiving an external signal; and means for comparing the expected result and the external signal to authenticate the identification.

5. A system for authenticating identification comprising:

first memory means adapted for storing a program representative of current date information to perform a preselected calculation on an input value to obtain an expected result;

means for generating the expected result in accordance with the calculation;

means for placing the first memory means in data communication with the generating means;

means for supplying the input value to the program whereby the calculation is performed thereon;

means for receiving an external signal; and means for comparing the expected result and the external signal to authenticate the identification.

6. A method of authentication comprising the steps of:

prestoring a preselected program in a first memory wherein the preselected program performs a preselected calculation on an input value to obtain an expected result;

placing the first memory means in data communication with an associated processor device;

supplying the input value to the preselected program whereby the calculation is performed;

generating with a generating means an expected result in accordance with the calculation;

placing a second memory means in data communication with the first memory means and the generating means, the second memory means being adapted for storage of a copy of the program of the first memory means;

reading out the program from the second memory means in accordance with the execution of the generating means;

receiving an external signal;

comparing the expected result and the external signal; and generating a comparison signal indicative of a comparison of the comparing means.

7. The method of claim 6 further comprising the steps of judging whether the comparison signal represents failure, and terminating the data communication between the first memory means and the associated processor device in accordance with the judging.

8. The method of claim 6 further comprising the step of writing the selected program in a preselected language.

9. The method of claim 8 wherein the method further comprises the steps of placing the second memory in data communication with the first memory; and storing a copy of the preselected program in the second memory.

10. The method of claim 9 wherein the second memory includes a compiler program stored therein and further comprises the step of translating the preselected language of the preselected program, by use of the compiler program, into an executable machine language program, prior to the step of generating an expected result.

11. A system for authenticating an identification comprising:

a personal identification unit having a first memory which includes a program stored therein wherein the program performs a uniquely assigned calculation on an input value to obtain an expected result;

a terminal device having means for placing the first memory in data communication therewith, means for generating the expected result in accordance with the calculation, means for supplying the input value to the program whereby the calculation is performed, means for receiving an external signal and means for comparing the expected result and the external signal to authenticate the identification;

a second memory means, placed in data communication with the first memory means and the generating means, the second memory means being adapted for storage of a copy of the program of the first memory means; and a means for reading out the program from the second memory means in accordance with the execution of the generating means.

12. The system of claim 11 further comprising a host computer, means for placing the terminal device in data communication with the host computer, and means for transmitting the result of the comparison to the host computer.

* * * * *